United States Patent [19]

Bennett et al.

[11] Patent Number: 5,236,575

[45] Date of Patent: Aug. 17, 1993

[54] SYNTHETIC POROUS CRYSTALLINE MCM-49, ITS SYNTHESIS AND USE

[75] Inventors: J. Michael Bennett, Radnor, Pa.; Clarence D. Chang, Princeton, N.J.; Stephen L. Lawton; Michael E. Leonowicz, both of Medford Lakes, N.J.; Daria N. Lissy, Glen Mills; Mae K. Rubin, Bala Cynwyd, both of Pa.

[73] Assignee: Mobil Oil Corp., Fairfax, Va.

[21] Appl. No.: 802,938

[22] Filed: Dec. 6, 1991

Related U.S. Application Data

[63] Continuation-in-part of Ser. No. 717,436, Jun. 19, 1991, abandoned.

[51] Int. Cl.$^5$ .................. C10G 35/095; C07C 15/00; B01S 21/00; C01B 33/34
[52] U.S. Cl. .................. 208/46; 585/407; 585/415; 502/77; 423/718; 423/706; 208/135
[58] Field of Search ............ 423/328, 329, 330, 305, 423/306, 277, 279, 718, 706; 208/46, 135; 585/407, 415; 502/77

[56] References Cited

U.S. PATENT DOCUMENTS

| | | | |
|---|---|---|---|
| 4,439,409 | 3/1984 | Puppe et al. | 423/328 |
| 4,826,667 | 5/1989 | Zones et al. | 423/277 |
| 4,954,325 | 9/1990 | Rubin et al. | 423/328 |
| 4,981,663 | 1/1991 | Rubin | 423/277 |
| 5,021,141 | 6/1991 | Rubin | 208/46 |

FOREIGN PATENT DOCUMENTS

0231860 8/1987 European Pat. Off. .
0293032 11/1988 European Pat. Off. .

Primary Examiner—R. Bruce Breneman
Attorney, Agent, or Firm—Alexander J. McKillop; Dennis P. Santini

[57] ABSTRACT

This invention relates to a new synthetic porous crystalline material, a method for its preparation and use thereof in catalytic conversion of organic compounds. The new crystalline material exhibits a distinctive X-ray diffraction pattern.

27 Claims, 4 Drawing Sheets

SYNTHETIC POROUS CRYSTALLINE MCM-49, ITS SYNTHESIS AND USE

CROSS-REFERENCE TO RELATED APPLICATIONS

This is a continuation-in-part of U.S. application Ser. No. 07/717,436, filed Jun. 19, 1991.

BACKGROUND OF THE INVENTION

1. Field of the Invention

This invention relates to a novel composition of synthetic porous crystalline material, to a method for its preparation and to its use in catalytic conversion of organic compounds.

2. Description of the Prior Art

Zeolitic materials, both natural and synthetic, have been demonstrated in the past to have catalytic properties for various types of hydrocarbon conversion. Certain zeolitic materials are ordered, porous crystalline aluminosilicates having a definite crystalline structure as determined by X-ray diffraction, within which there are a large number of smaller cavities which may be interconnected by a number of still smaller channels or pores. These cavities and pores are uniform in size within a specific zeolitic material. Since the dimensions of these pores are such as to accept for adsorption molecules of certain dimensions while rejecting those of larger dimensions, these materials have come to be known as "molecular sieves" and are utilized in a variety of ways to take advantage of these properties.

Such molecular sieves, both natural and synthetic, include a wide variety of positive ion-containing crystalline silicates. These silicates can be described as a rigid three-dimensional framework of $SiO_4$ and Periodic Table Group IIIA element oxide, e.g. $AlO_4$, in which the tetrahedra are cross-linked by the sharing of oxygen atoms whereby the ratio of the total Group IIIA element, e.g. aluminum, and silicon atoms to oxygen atoms is 1:2. The electrovalence of the tetrahedra containing the Group IIIA element, e.g. aluminum, is balanced by the inclusion in the crystal of a cation, for example an alkali metal or an alkaline earth metal cation. This can be expressed wherein the ratio of the Group IIIA element, e.g. aluminum, to the number of various cations, such as Ca/2, Sr/2, Na, K or Li, is equal to unity. One type of cation may be exchanged either entirely or partially with another type of cation utilizing ion exchange techniques in a conventional manner. By means of such cation exchange, it has been possible to vary the properties of a given silicate by suitable selection of the cation. The spaces between the tetrahedra are occupied by molecules of water prior to dehydration.

Prior art techniques have resulted in the formation of a great variety of synthetic zeolites. Many of these zeolites have come to be designated by letter or other convenient symbols, as illustrated by zeolite A (U.S. Pat. No. 2,882,243); zeolite X (U.S. Pat. No. 2,882,244); zeolite Y (U.S. Pat. No. 3,130,007); zeolite ZK-5 (U.S. Pat. No. 3,247,195); zeolite ZK-4 (U.S. Pat. No. 3,314,752); zeolite ZSM-5 (U.S. Pat. No. 3,702,886); zeolite ZSM-11 (U.S. Pat. No. 3,709,979); zeolite ZSM-12 (U.S. Pat. No. 3,832,449), zeolite ZSM-20 (U.S. Pat. No. 3,972,983); ZSM-35 (U.S. Patent 4,016,245); zeolite ZSM-23 (U.S. Pat. No. 4,076,842); zeolite MCM-22 (U.S. Pat. No. 4,954,325); and zeolite MCM-35 (U.S. Pat. No. 4,981,663), merely to name a few.

The $SiO_2/Al_2O_3$ ratio of a given zeolite is often variable. For example, zeolite X can be synthesized with $SiO_2/Al_2O_3$ ratios of from 2 to 3; zeolite Y, from 3 to about 6. In some zeolites, the upper limit of the $SiO_2/Al_2O_3$ ratio is unbounded. ZSM-5 is one such example wherein the $SiO_2/Al_2O_3$ ratio is at least 5 and up to the limits of present analytical measurement techniques. U.S. Pat. No. 3,941,871 (Re. 29,948) discloses a porous crystalline silicate made from a reaction mixture containing no deliberately added alumina in the recipe and exhibiting the X-ray diffraction pattern characteristic of ZSM-5. U.S. Pat. Nos. 4,061,724, 4,073,865 and 4,104,294 describe crystalline silicate of varying alumina and metal content.

U.S. Pat. No. 4,439,409 refers to a composition of matter named PSH-3 and its synthesis from a reaction mixture containing hexamethyleneimine, an organic compound which acts as directing agent for synthesis of the present MCM-49. A composition of matter appearing to be identical to the PSH-3 of U.S. Pat. No. 4,439,409, but with additional structural components, is taught in European Patent Application 293,032. Hexamethyleneimine is also used for synthesis of MCM-22 in U.S. Pat. No. 4,954,325; MCM-35 in U.S. Pat. No. 4,981,663; and a ZSM-12 material in U.S. Patent 5,021,141. A composition of matter referred to as zeolite SSZ-25 is taught in U.S. Pat. No. 4,826,667 and European Patent Application 231,860, said zeolite being synthesized from a reaction mixture containing an adamantane quaternary ammonium ion.

SUMMARY OF THE INVENTION

The present invention is directed to a novel composition of a porous crystalline material, named MCM-49, a method for its preparation, and the conversion of organic compounds contacted with an active form thereof. The calcined form of the porous crystalline material of this invention transforms to a material not readily distinguishable from calcined crystalline material MCM-22 described in U.S. Pat. No. 4,954,325. The instant crystalline material does not appear to contain all the components apparently present in the PSH-3 composition described in U.S. Pat. No. 4,439,409 The composition of this invention is not contaminated with ZSM-12 or ZSM-5. The calcination transformation product exhibits unusual sorption capacities and unique catalytic utility when compared to PSH-3 synthesized in accordance with U.S. Pat. No. 4,439,409. It exhibits unique catalytic utility when compared to MCM-22 synthesized as taught in U.S. Pat. No. 4,954,325.

DESCRIPTION OF SPECIFIC EMBODIMENTS

Figure 1A:
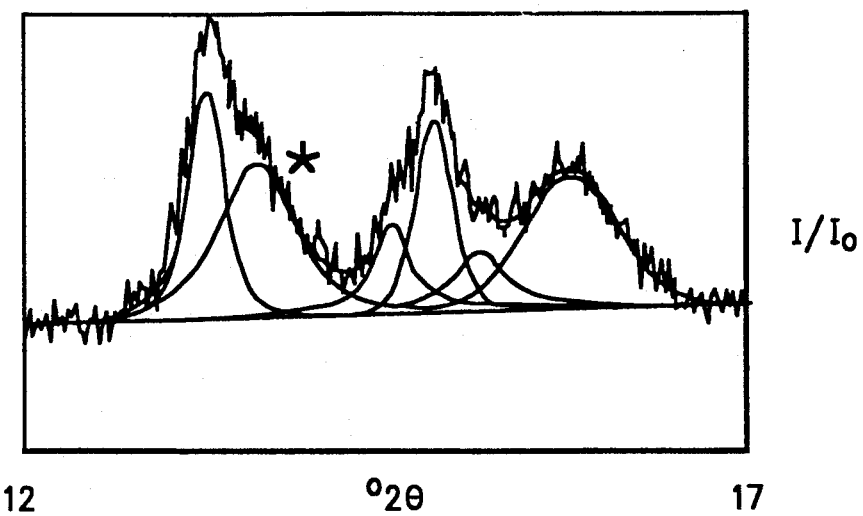
FIG. 1a shows a segment of the X-ray diffraction pattern of the as-synthesized precursor of MCM-22 from a repeat of Example 1 of U.S. Pat. No. 4,954,325.

The crystalline material of this invention has a composition involving the molar relationship:

$X_2O_3:(n)YO_2$, wherein X is a trivalent element, such as aluminum, boron, iron and/or gallium, preferably aluminum; Y is a tetravalent element such as silicon and/or germanium, preferably silicon; and n is less than about 35, e.g. from 2 to less than about 35, usually from about 10 to less than about 35, more usually from about 15 to about 31. In the as-synthesized form, the material has a formula, on an anhydrous basis and in terms of moles of oxides per n moles of $YO_2$, as follows:

$(0.1-0.6)M_2O:(1-4)R:X_2O_3:nYO_2$ wherein M is an alkali or alkaline earth metal, and R is an organic moiety. The M and R components are associated with the material as a result of their presence during crystallization, and are easily removed by post-crystallization methods hereinafter more particularly described.

The crystalline material of the invention is thermally stable and in the calcined form exhibits high surface area (greater than 400 $m^2$/gm) and unusually large sorption capacity when compared to previously described materials such as calcined PSH-3 and SSZ-25 having similar X-ray diffraction patterns. To the extent desired, the original sodium cations of the as-synthesized material can be replaced in accordance with techniques well known in the art, at least in part, by ion exchange with other cations. Preferred replacing cations include metal ions, hydrogen ions, hydrogen precursor, e.g. ammonium, ions and mixtures thereof. Particularly preferred cations are those which tailor the catalytic activity for certain hydrocarbon conversion reactions. These include hydrogen, rare earth metals and metals of Groups IIA, IIIA, IVA, IB, IIB, IIIB, IVB and VIII of the Periodic Table of the Elements.

In the as-synthesized form, the crystalline MCM-49 material of the invention appears to be a single crystalline phase. It can be prepared in essentially pure form with little or no detectable impurity crystal phases and has an X-ray diffraction pattern which is distinguished from the patterns of other known as-synthesized or thermally treated crystalline materials by the lines listed in Table I below:

TABLE I

| Interplanar d-Spacing (A) | Relative Intensity, I/Io × 100 |
|---|---|
| 13.15 ± 0.26 | w-s* |
| 12.49 ± 0.24 | vs |
| 11.19 ± 0.22 | m-s |
| 6.43 ± 0.12 | w |
| 4.98 ± 0.10 | w |
| 4.69 ± 0.09 | w |
| 3.44 ± 0.07 | vs |
| 3.24 ± 0.06 | w |

*shoulder

The X-ray diffraction peak at 13.15±0.26 Angstrom Units (A) is usually not fully resolved for MCM-49 from the intense peak at 12.49±0.24, and is observed as a shoulder of this intense peak. For this reason, the precise intensity and position of the 13.15±0.26 Angstroms peak are difficult to determine within the stated range.

In its calcined form, the crystalline MCM-49 material of the invention transforms to a single crystal phase with little or no detectable impurity crystal phases having an X-ray diffraction pattern which is not readily distinguished from that of MCM-22, but distinguishable from the patterns of other known crystalline materials. The X-ray diffraction pattern of the calcined form of MCM-49 includes the lines listed in Table II below:

TABLE II

| Interplanar d-Spacing (A) | Relative Intensity, I/Io × 100 |
|---|---|
| 12.41 ± 0.24 | vs |
| 11.10 ± 0.22 | s |
| 8.89 ± 0.17 | m-s |
| 6.89 ± 0.13 | w |
| 6.19 ± 0.12 | m |
| 6.01 ± 0.12 | w |
| 5.56 ± 0.11 | w |
| 4.96 ± 0.10 | w |
| 4.67 ± 0.09 | w |
| 4.59 ± 0.09 | w |
| 4.39 ± 0.09 | w |
| 4.12 ± 0.08 | w |
| 4.07 ± 0.08 | w-m |
| 3.92 ± 0.08 | w-m |
| 3.75 ± 0.07 | w-m |
| 3.57 ± 0.07 | w |
| 3.43 ± 0.07 | s-vs |
| 3.31 ± 0.06 | w |
| 3.21 ± 0.06 | w |
| 3.12 ± 0.06 | w |
| 3.07 ± 0.06 | w |
| 2.83 ± 0.05 | w |
| 2.78 ± 0.05 | w |
| 2.69 ± 0.05 | w |
| 2.47 ± 0.05 | w |
| 2.42 ± 0.05 | w |
| 2.38 ± 0.05 | w |

These X-ray diffraction data were collected with a Scintag diffraction system, equipped with a germanium solid state detector, using copper K-alpha radiation. The diffraction data were recorded by step-scanning at 0.02 degrees of two-theta, where theta is the Bragg angle, and a counting time of 10 seconds for each step. The interplanar spacings, d's, were calculated in Angstrom units (A), and the relative intensities of the lines, I/I$_o$ is one-hundredth of the intensity of the strongest line, above background, were derived with the use of a profile fitting routine (or second derivative algorithm). The intensities are uncorrected for Lorentz and polarization effects. The relative intensities are given in terms of the symbols vs=very strong (60–100), s=strong (40–60), m=medium (20–40) and w=weak (0–20). It should be understood that diffraction data listed for this sample as single lines may consist of multiple overlapping lines which under certain conditions, such as differences in crystallographic changes, may appear as resolved or partially resolved lines. Typically, crystallographic changes can include minor changes in unit cell parameters and/or a change in crystal symmetry, without a change in the structure. These minor effects, including changes in relative intensities, can also occur as a result of differences in cation content, framework composition, nature and degree of pore filling, and thermal and/or hydrothermal history. Other changes in diffraction patterns can be indicative of important differences between materials, which is the case for comparing MCM-49 with similar materials, e.g. MCM-22 and PSH-3.

The significance of differences in the X-ray diffraction patterns of these materials can be explained from a knowledge of the structures of the materials. MCM-22 and PSH-3 are members of an unusual family of materials because, upon calcination, there are changes in the X-ray diffraction pattern that can be explained by a significant change in one axial dimension. This is indicative of a profound change in the bonding within the materials and not a simple loss of the organic material. The precursor members of this family can be clearly distinguished by X-ray diffraction from the calcined members. An examination of the X-ray diffraction patterns of both precursor and calcined forms shows a number of reflections with very similar position and intensity, while other peaks are different. Some of these differences are directly related to the changes in the axial dimension and bonding.

Figure 1B:
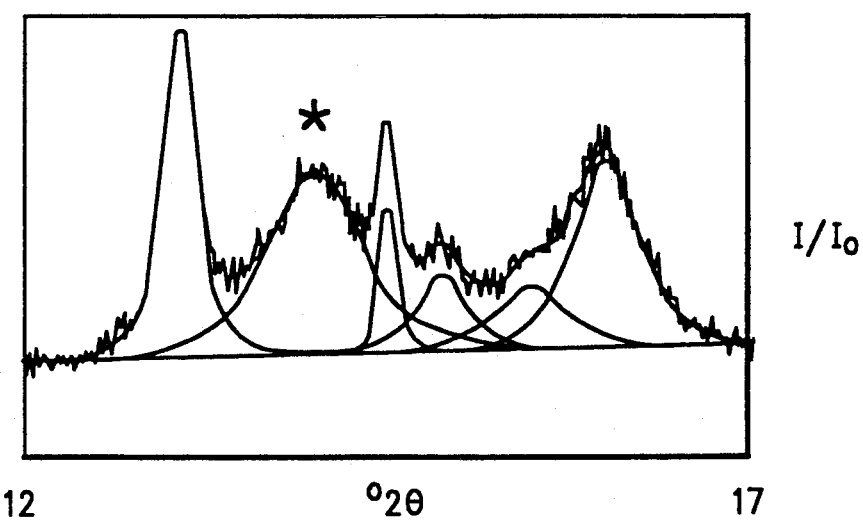
FIG. 1b shows a segment of the X-ray diffraction pattern of the as-synthesized crystalline material product of Example 7, hereinafter presented.
Figure 1C:
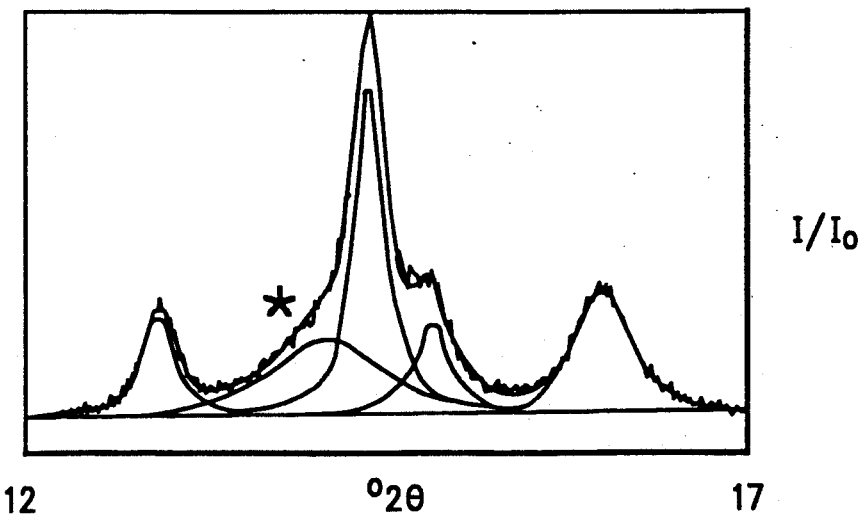
FIG. 1c shows a segment of the X-ray diffraction pattern of the calcined MCM-22 from a repeat of Example 1 of U.S. Pat. No. 4,954,325.

The present as-synthesized MCM-49 has an axial dimension similar to those of the calcined members of the family and, hence, there are similarities in their X-ray diffraction patterns. Nevertheless, the MCM-49 axial dimension is different from that observed in the calcined materials. For example, the changes in axial dimensions in MCM-22 can be determined from the positions of peaks particularly sensitive to these changes. Two such peaks occur at ~13.5 Angstroms and ~6.75 Angstroms in precursor MCM-22, at ~12.8 Angstroms and ~6.4 Angstroms in as-synthesized MCM-49, and at ~12.6 Angstroms and ~6.30 Angstroms in the calcined MCM-22. Unfortunately, the ~12.8 Angstroms peak in MCM-49 is very close to the intense ~12.4 Angstroms peak observed for all three materials, and is frequently not fully separated from it. Likewise, the ~12.6 Angstroms peak of the calcined MCM-22 material is usually only visible as a shoulder on the intense ~12.4 Angstroms peak. FIG. 1 shows the same segment of the diffraction patterns of precursor MCM-22, calcined MCM-22, and MCM-49; the position of the ~6.6–6.3 Angstroms peak is indicated in each segment by an asterisk. Because the ~6.4 Angstroms peak is unobscured in MCM-49, it was chosen as a better means of distinguishing MCM-49 from the calcined forms of MCM-22 and PSH-3 rather than the much stronger ~12.8 Angstroms peak. Table I lists all diffraction peaks characteristic of MCM-49.

When used as a catalyst, the crystalline material of the invention may be subjected to treatment to remove part or all of any organic constituent. The crystalline material can also be used as a catalyst in intimate combination with a hydrogenating component such as tungsten, vanadium, molybdenum, rhenium, nickel, cobalt, chromium, manganese, or a noble metal such as platinum or palladium where a hydrogenation-dehydrogenation function is to be performed. Such component can be in the composition by way of cocrystallization, exchanged into the composition to the extent a Group IIIA element, e.g. aluminum, is in the structure, impregnated therein or intimately physically admixed therewith. Such component can be impregnated in or on to it such as, for example, by, in the case of platinum, treating the silicate with a solution containing a platinum metal-containing ion. Thus, suitable platinum compounds for this purpose include chloroplatinic acid, platinous chloride and various compounds containing the platinum amine complex.

The above crystalline MCM-49 material can be transformed to another form by thermal treatment. This thermal treatment is generally performed by heating at a temperature of at least about 370° C. for at least 1 minute and generally not longer than 20 hours. While subatmospheric pressure can be employed for the thermal treatment, atmospheric pressure is desired for reasons of convenience. The thermal treatment can be performed at a temperature up to about 925° C. The thermally treated product, especially in its metal, hydrogen and ammonium forms, is particularly useful in the catalysis of certain organic, e.g. hydrocarbon, conversion reactions. Non-limiting examples of such reactions include those for which MCM-22 may be used as catalyst. Incorporated herein by reference for the descriptions of those particular conversion reactions are U.S. Pat. Nos. 4,954,325; 4,973,784; 4,992,611; 4,956,514; 4,962,250; 4,982,033; 4,962,257; 4,962,256; 4,992,606; 4,954,663; 4,992,615; 4,983,276; 4,982,040; 4,962,239; 4,968,402; 5,000,839; 5,001,296; 4,986,894; 5,001,295; 5,001,283; 5,012,033; 5,019,670; 5,019,665; 5,019,664; and 5,013,422.

The crystalline material of this invention, when employed either as an adsorbent or as a catalyst in an organic compound conversion process should be dehydrated, at least partially. This can be done by heating to a temperature in the range of 200° C. to about 370° C. in an atmosphere such as air, nitrogen, etc. and at atmospheric, subatmospheric or superatmospheric pressures for between 30 minutes and 48 hours. Dehydration can also be performed at room temperature merely by placing the MCM-49 in a vacuum, but a longer time is required to obtain a sufficient amount of dehydration.

The present crystalline material can be prepared from a reaction mixture containing sources of alkali or alkaline earth metal (M), e.g. sodium or potassium, cation, an oxide of trivalent element X, e.g. aluminum, an oxide of tetravalent element Y, e.g. silicon, directing agent (R), and water, said reaction mixture having a composition, in terms of mole ratios of oxides, within the following ranges:

| Reactants | Useful | Preferred |
|---|---|---|
| $YO_2/X_2O_3$ | 12 to <35 | 18 to 31 |
| $H_2O/YO_2$ | 10 to 70 | 15 to 40 |
| $OH^-/YO_2$ | 0.05 to 0.50 | 0.05 to 0.30 |
| $M/YO_2$ | 0.05 to 3.0 | 0.05 to 1.0 |
| $R/YO_2$ | 0.2 to 1.0 | 0.3 to 0.5 |

In this synthesis method, if more than one X component is present, at least one must be present such that the $YO_2/X_2O_3$ molar ratio thereof is less than about 35. For example, if aluminum oxide and gallium oxide components are used in the reaction mixture, at least one of the $YO_2/Al_2O_3$ and $YO_2/Ga_2O_3$ molar ratios must be less than about 35. If only aluminum oxide has been added to the reaction mixture as a source of X, the $YO_2/Al_2O_3$ ratio must be less than about 35.

In the present synthesis method, the source of $YO_2$ must be comprised predominantly of solid $YO_2$, for example at least about 30 wt. % solid $YO_2$ in order to obtain the crystal product of the containing at least about 30 wt. % solid silica, e.g. Ultrasil (a precipitated, spray dried silica containing about 90 wt. % silica) or HiSil (a precipitated hydrated $SiO_2$ containing about 87 wt. % silica, about 6 wt. % free $H_2O$ and about 4.5 wt. % bound $H_2O$ of hydration and having a particle size of about 0.02 micron) favors crystalline MCM-49 formation from the above mixture. Preferably, therefore, the $YO_2$, e.g. silica, source contains at least about 30 wt. % solid $YO_2$, e.g. silica, and more preferably at least about 40 wt. % solid $YO_2$, e.g. silica.

Directing agent R is selected from the group consisting of cycloalkylamine, azacycloalkane, diazacycloalkane, and mixtures thereof, alkyl comprising from 5 to 8 carbon atoms. Non-limiting examples of R include cyclopentylamine, cyclohexylamine, cycloheptylamine, hexamethyleneimine, heptamethyleneimine, homopiperazine, and combinations thereof.

Crystallization of the present crystalline material can be carried out at either static or stirred conditions in a suitable reactor vessel, such as for example, polypropylene jars or teflon lined or stainless steel autoclaves. The total useful range of temperatures for crystallization is from about 80° C. to about 225° C. for a time sufficient for crystallization to occur at the temperature used, e.g. from about 24 hours to about 60 days. Thereafter, the crystals are separated from the liquid and recovered.

It should be realized that the reaction mixture components can be supplied by more than one source. The reaction mixture can be prepared either batchwise or continuously. Crystal size and crystallization time of the new crystalline material will vary with the nature of the reaction mixture employed and the crystallization conditions.

Synthesis of the new crystals may be facilitated by the presence of at least 0.01 percent, preferably 0.10 percent and still more preferably 1 percent, seed crystals (based on total weight) of crystalline product. Useful seed crystals include MCM-22 and/or MCM-49.

The crystals prepared by the instant invention can be shaped into a wide variety of particle sizes. Generally speaking, the particles can be in the form of a powder, a granule, or a molded product, such as an extrudate having particle size sufficient to pass through a 2 mesh (Tyler) screen and be retained on a 400 mesh (Tyler) screen. In cases where the catalyst is molded, such as by extrusion, the crystals can be extruded before drying or partially dried and then extruded.

The crystalline material of this invention can be used to catalyze a wide variety of chemical conversion processes including many of present commercial/industrial importance. Examples of chemical conversion processes which are effectively catalyzed by the crystalline material of this invention, by itself or in combination with one or more other catalytically active substances including other crystalline catalysts, include those requiring a catalyst with acid activity. Specific examples include:

(1) alkylation of aromatic hydrocarbons, e.g. benzene, with long chain olefins, e.g. $C_{14}$ olefin, with reaction conditions including a temperature of from about 340° C. to about 500° C., a pressure of from about atmospheric to about 200 atmospheres, a weight hourly space velocity of from about 2 $hr^{-1}$ to about 2000 $hr^{-1}$ and an aromatic hydrocarbon/olefin mole ratio of from about 1/1 to about 20/1, to provide long chain alkyl aromatics which can be subsequently sulfonated to provide synthetic detergents;

(2) alkylation of aromatic hydrocarbons with gaseous olefins to provide short chain alkyl aromatic compounds, e.g. the alkylation of benzene with propylene to provide cumene, with reaction conditions including a temperature of from about 10° C. to about 125° C., a pressure of from about 1 to about 30 atmospheres, and an aromatic hydrocarbon weight hourly space velocity (WHSV) of from 5 $hr^{-1}$ to about 50 $hr^{-1}$;

(3) alkylation of reformate containing substantial quantities of benzene and toluene with fuel gas containing $C_5$ olefins to provide, inter alia, mono- and dialkylates with reaction conditions including a temperature of from about 315° C. to about 455° C., a pressure of from about 400 to about 800 psig, a WHSV-olefin of from about 0.4 $hr^{-1}$ to about 0.8 $hr^{-1}$, a WHSV-reformate of from about 1 hr to about 2 hr and a gas recycle of from about 1.5 to 2.5 vol/vol fuel gas feed;

(4) alkylation of aromatic hydrocarbons, e.g. benzene, toluene, xylene and naphthalene, with long chain olefins, e.g. $C_{14}$ olefin, to provide alkylated aromatic lube base stocks with reaction conditions including a temperature of from about 160° C. to about 260° C. and a pressure of from about 350 to 450 psig; and (5) alkylation of phenols with olefins or equivalent alcohols to provide long chain alkyl phenols with reaction conditions including a temperature of from about 200° C. to about 250° C., a pressure of from about 200 to 300 psig and a total WHSV of from about 2 $hr^{-1}$ to about 10 $hr^{-1}$.

In the case of many catalysts, it is desired to incorporate the new crystal with another material resistant to the temperatures and other conditions employed in organic conversion processes. Such materials include active and inactive materials and synthetic or naturally occurring zeolites as well as inorganic materials such as clays, silica and/or metal oxides such as alumina. The latter may be either naturally occurring or in the form of gelatinous precipitates or gels including mixtures of silica and metal oxides. Use of a material in conjunction with the new crystal, i.e. combined therewith or present during synthesis of the new crystal, which is active, tends to change the conversion and/or selectivity of the catalyst in certain organic conversion processes. Inactive materials suitably serve as diluents to control the amount of conversion in a given process so that products can be obtained economically and orderly without employing other means for controlling the rate of reaction. These materials may be incorporated into naturally occurring clays, e.g. bentonite and kaolin, to improve the crush strength of the catalyst under commercial operating conditions. Said materials, i.e. clays, oxides, etc., function as binders for the catalyst. It is desirable to provide a catalyst having good crush strength because in commercial use it is desirable to prevent the catalyst from breaking down into powder-like materials. These clay and/or oxide binders have been employed normally only for the purpose of improving the crush strength of the catalyst.

Naturally occurring clays which can be composited with the new crystal include the montmorillonite and kaolin family, which families include the subbentonites, and the kaolins commonly known as Dixie, McNamee, Georgia and Florida clays or others in which the main mineral constituent is halloysite, kaolinite, dickite, nacrite, or anauxite. Such clays can be used in the raw state as originally mined or initially subjected to calcination, acid treatment or chemical modification. Binders useful for compositing with the present crystal also include inorganic oxides, notably alumina.

In addition to the foregoing materials, the new crystal can be composited with a porous matrix material such as silica-alumina, silica-magnesia, silica-zirconia, silica-thoria, silica-beryllia, silica-titania as well as ternary compositions such as silica-alumina-thoria, silica-alumina-zirconia silica-alumina-magnesia and silica-magnesia-zirconia.

The relative proportions of finely divided crystalline material and inorganic oxide matrix vary widely, with the crystal content ranging from about 1 to about 90 percent by weight and more usually, particularly when the composite is prepared in the form of beads, in the range of about 2 to about 80 weight percent of the composite.

In order to more fully illustrate the nature of the invention and the manner of practicing same, the following examples are presented. In the examples, whenever sorption data are set forth for comparison of sorptive capacities for water, cyclohexane and/or n-hexane, they were Equilibrium Adsorption values determined as follows:

A weighed sample of the calcined adsorbant was contacted with the desired pure adsorbate vapor in an adsorption chamber, evacuated to less than 1 mm and contacted with 12 Torr of water vapor and 40 Torr of n-hexane or cyclohexane vapor, pressures less than the vapor-liquid equilibrium pressure of the respective adsorbate at 90° C. The pressure was kept constant (within about ±0.5 mm) by addition of adsorbate vapor controlled by a manostat during the adsorption period, which did not exceed about 8 hours. As adsorbate was adsorbed by the new crystal, the decrease in pressure caused the manostat to open a valve which admitted more adsorbate vapor to the chamber to restore the above control pressures. Sorption was complete when the pressure change was not sufficient to activate the manostat. The increase in weight was calculated as the adsorption capacity of the sample in g/100 g of calcined adsorbant. The new synthetic material of this invention always exhibits Equilibrium Adsorption values of greater than about 10 wt. % for water vapor, greater than about 4.3 wt. %, usually greater than about 7 wt. % for cyclohexane vapor and greater than about 10 wt. % for n-hexane vapor. These vapor sorption capacities are a notable distinguishing feature of the present crystalline material.

When Alpha Value is examined, it is noted that the Alpha Value is an approximate indication of the catalytic cracking activity of the catalyst compared to a standard catalyst and it gives the relative rate constant (rate of normal hexane conversion per volume of catalyst per unit time). It is based on the activity of silica-alumina cracking catalyst taken as an Alpha of 1 (Rate Constant=0.016 sec$^{-1}$). The Alpha Test is described in U.S. Pat. No. 3,354,078; in the *Journal of Catalysis*, Vol. 4, p. 527 (1965); Vol. 6, p. 278 (1966); and Vol. 61, p. 395 (1980), each incorporated herein by reference as to that description. The experimental conditions of the test used herein include a constant temperature of 538° C. and a variable flow rate as described in detail in the *Journal of Catalysis*, Vol. 61, p. 395.

EXAMPLE 1

A 1 part quantity of $Al_2(SO_4)_3 \cdot xH_2O$ was dissolved in a solution containing 1.83 parts of 50% NaOH solution and 13 parts of $H_2O$. To this were added 1.78 parts of hexamethyleneimine (HMI) followed by 6.6 parts of amorphous silica precursor (46% solids). The mixture was thoroughly mixed until uniform.

The reaction mixture had the following composition in mole ratios:

| | |
|---|---|
| $SiO_2/Al_2O_3 =$ | 30 |
| $OH^-/SiO_2 =$ | 0.25 |
| $Na/SiO_2 =$ | 0.43 |
| $HMI/SiO_2 =$ | 0.35 |
| $H_2O/SiO_2 =$ | 19.4 |

Figure 2:
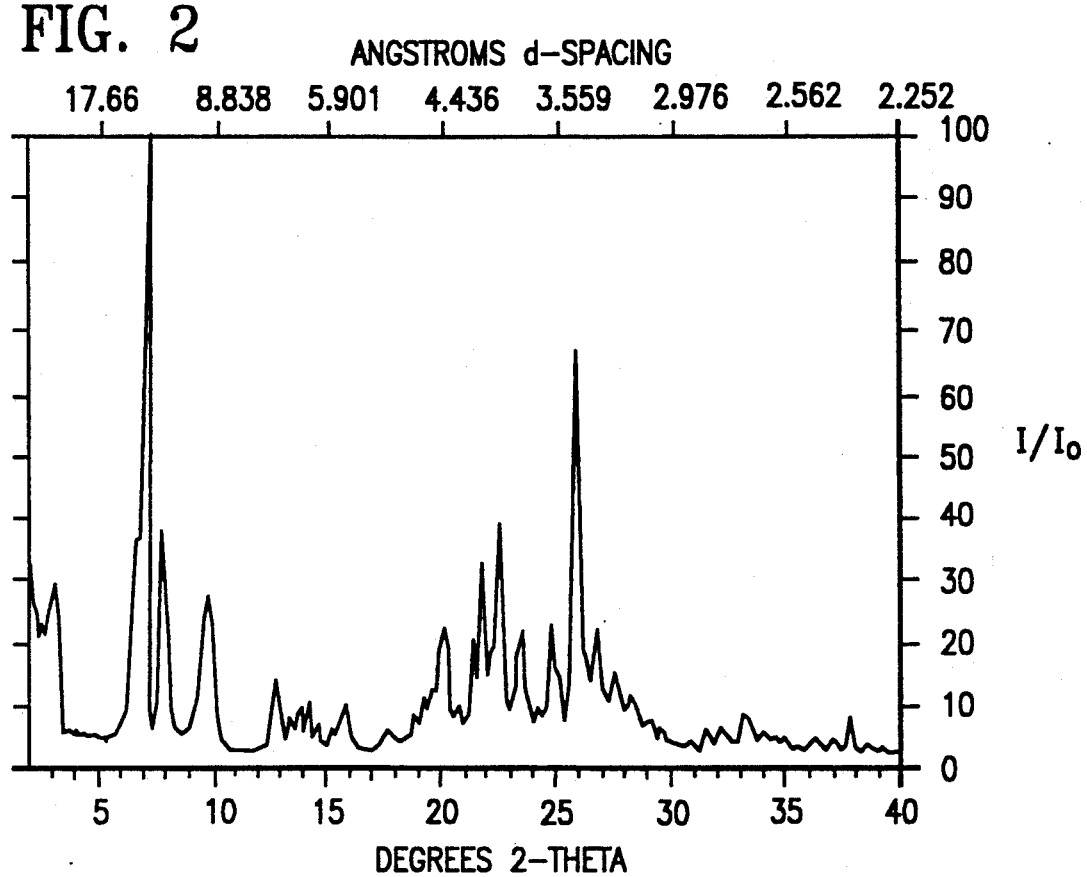
FIGS. 2–7 are X-ray diffraction patterns of the as-synthesized crystalline material products of Examples 1, 3, 5, 7, 8, and 11, respectively, hereinafter presented.

The mixture was crystallized in a stirred reactor at 150° C. for 4 days. The crystals were filtered, washed with water and dried at 120° C. A portion of the product was submitted for X-ray analysis and identified as the new crystalline material MCM-49. The material exhibited the X-ray powder diffraction pattern as shown in Table III and FIG. 2.

The chemical composition of the product was, in wt. %:

| | |
|---|---|
| N | 1.81 |
| Na | 0.38 |
| $Al_2O_3$ | 7.1 |
| $SiO_2$ | 72.8 |
| Ash | 79.2 |

The $SiO_2/Al_2O_3$ molar ratio of this product was 17.4.

The sorption capacities, after calcining for 6 hours at 538° C. were, in wt. %:

| | |
|---|---|
| Cyclohexane, 40 Torr | 4.4 |
| n-Hexane, 40 Torr | 12.8 |
| $H_2O$, 12 Torr | 11.1 |

A portion of the sample was calcined in air for 16 hours at 538° C. This material exhibited the X-ray diffraction pattern shown in Table IV.

TABLE III

| Degrees 2-Theta | Interplanar d-spacing (A) | $I/I_o$ |
|---|---|---|
| 3.2 | 27.5 | 11 |
| 6.75 | 13.09 | 36 sh |
| 7.08 | 12.49 | 100 |
| 7.88 | 11.23 | 40 |
| 9.81 | 9.02 | 24 |
| 12.79 | 6.92 | 13 |
| 13.42 | 6.60 | 5* |
| 13.87 | 6.38 | 6 |
| 14.24 | 6.22 | 7 |
| 14.64 | 6.05 | 4 |
| 15.24 | 5.81 | 2 |
| 15.81 | 5.61 | 8 |
| 17.72 | 5.01 | 2 |
| 18.91 | 4.69 | 4 |
| 19.27 | 4.61 | 5 |
| 20.09 | 4.42 | 19 |
| 20.83 | 4.26 | 6 |
| 21.48 | 4.14 | 15 |
| 21.78 | 4.08 | 29 |
| 22.22 | 4.00 | 12 |
| 22.59 | 3.94 | 36 |
| 23.56 | 3.78 | 19 |
| 24.87 | 3.58 | 21 |
| 25.10 | 3.55 | 6 |
| 25.89 | 3.44 | 80 |
| 26.32 | 3.39 | 7 |
| 26.81 | 3.33 | 17 |
| 27.57 | 3.24 | 11 |
| 28.36 | 3.15 | 7 |
| 29.03 | 3.08 | 3 |
| 29.50 | 3.03 | 2 |
| 31.47 | 2.842 | 3 |
| 32.16 | 2.784 | 3 |
| 33.26 | 2.694 | 6 |
| 34.08 | 2.631 | 2 |
| 34.83 | 2.576 | 1 |
| 36.25 | 2.478 | 2 |
| 36.96 | 2.432 | 2 |
| 37.72 | 2.385 | 7 | sh = Shoulder
* = Impurity peak

TABLE IV

| Degrees 2-Theta | Interplanar d-spacing (A) | $I/I_o$ |
|---|---|---|
| 3.4 | 26.0 | 6 |
| 6.96 | 12.69 | 45 sh |

TABLE IV-continued

| Degrees 2-Theta | Interplanar d-spacing (A) | I/I$_o$ |
|---|---|---|
| 7.15 | 12.37 | 100 |
| 7.97 | 11.09 | 58 |
| 9.97 | 8.87 | 49 |
| 12.88 | 6.88 | 10 |
| 13.50 | 6.56 | 3* |
| 14.34 | 6.18 | 26 |
| 14.76 | 6.00 | 8 |
| 15.30 | 5.79 | 1 |
| 15.96 | 5.55 | 13 |
| 17.84 | 4.97 | 1 |
| 19.03 | 4.66 | 3 |
| 19.34 | 4.59 | 2 |
| 19.67 | 4.51 | 2* |
| 20.26 | 4.38 | 10 |
| 21.18 | 4.20 | 3 |
| 21.59 | 4.12 | 10 |
| 21.88 | 4.06 | 17 |
| 22.40 | 3.97 | 8 |
| 22.72 | 3.91 | 28 |
| 23.74 | 3.75 | 16 |
| 24.73 | 3.60 | 3 |
| 24.98 | 3.57 | 10 |
| 25.23 | 3.53 | 5 |
| 26.00 | 3.43 | 57 |
| 26.98 | 3.30 | 12 |
| 27.81 | 3.21 | 12 |
| 28.64 | 3.12 | 7 |
| 29.14 | 3.06 | 2 |
| 29.69 | 3.01 | 2 |
| 31.62 | 2.830 | 3 |
| 32.28 | 2.773 | 3 |
| 33.38 | 2.685 | 6 |
| 34.43 | 2.605 | 2 |
| 34.98 | 2.565 | 2 |
| 36.39 | 2.469 | 1 |
| 37.09 | 2.424 | 2 |
| 37.86 | 2.377 | 4 | sh = Shoulder
* = Impurity peak

EXAMPLE 2

The calcined portion of the product of Example 1 was ammonium exchanged and calcined at 538° C. in air for 16 hours to provide the hydrogen form transformation product of the crystalline MCM-49. The Alpha Test proved this material to have an Alpha Value of 291.

EXAMPLE 3

A 1.45 part quantity of sodium aluminate was added to a solution containing 1 part of 50% NaOH solution and 53.1 parts H$_2$O. A 5.4 part quantity of HMI was added, followed by 10.3 parts of Ultrasil, a precipitated spray-dried silica (about 90% SiO$_2$). The reaction mixture was thoroughly mixed and transferred to a stainless steel autoclave equipped with a stirrer.

The reaction mixture had the following composition in mole ratios:

| | |
|---|---|
| SiO$_2$/Al$_2$O$_3$ = | 25 |
| OH$^-$/SiO$_2$ = | 0.19 |
| Na/SiO$_2$ = | 0.19 |
| HMI/SiO$_2$ = | 0.35 |
| H$_2$O/SiO$_2$ = | 19.3 |

Figure 3:
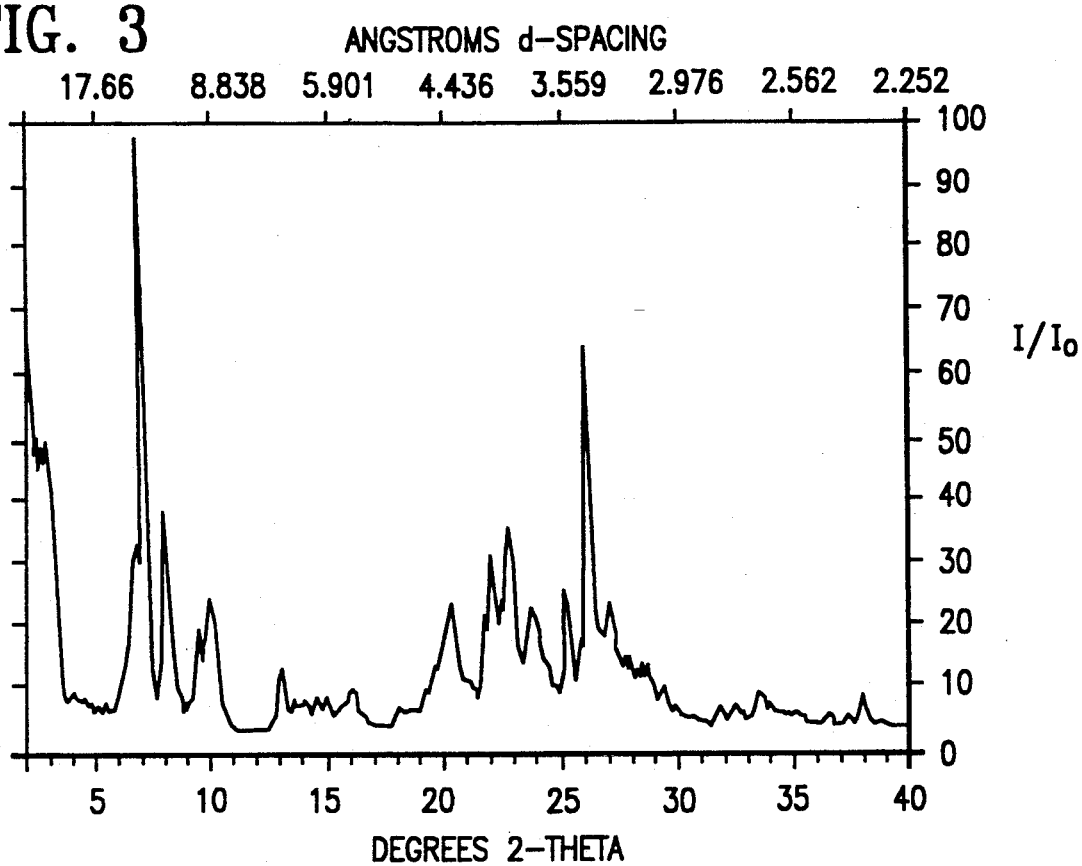

The mixture was crystallized with stirring at 150° C. for 8 days. The product was identified as poorly crystalline MCM-49 and had the X-ray pattern which appears in Table V and FIG. 3.

The chemical composition of the product was, in wt. %:

| | |
|---|---|
| N | 2.29 |
| Na | 0.19 |
| Al$_2$O$_3$ | 6.3 |
| SiO$_2$ | 71.0 |
| Ash | 77.9 |

The silica/alumina mole ratio of the product was 19.2.

The sorption capacitites, after calcining for 16 hours at 538° C. were, in wt. %:

| | |
|---|---|
| Cyclohexane, 40 Torr | 9.9 |
| n-Hexane, 40 Torr | 14.6 |
| H$_2$O, 12 Torr | 15.1 |

A portion of the sample was calcined in air for 16 hours at 538° C. This material exhibited the X-ray diffraction pattern shown in Table VI.

TABLE V

| Degrees 2-Theta | Interplanar d-spacing (A) | I/I$_o$ |
|---|---|---|
| 3.0 | 29.3 | 8 |
| 3.9 | 22.8 | 2+ |
| 6.66 | 13.27 | 34 |
| 7.10 | 12.45 | 100 |
| 7.91 | 11.18 | 39 |
| 9.24 | 9.57 | 16* |
| 9.79 | 9.04 | 23 |
| 12.79 | 6.92 | 11 |
| 13.60 | 6.51 | 5 |
| 14.28 | 6.20 | 5 |
| 14.68 | 6.03 | 5 |
| 15.33 | 5.78 | 2 |
| 15.83 | 5.60 | 7 |
| 17.80 | 4.98 | 2 |
| 18.94 | 4.68 | 3 |
| 19.32 | 4.59 | 8 |
| 20.09 | 4.42 | 21 |
| 21.51 | 4.13 | 17 |
| 21.82 | 4.07 | 27 |
| 22.17 | 4.01 | 13 |
| 22.58 | 3.94 | 33 |
| 23.50 | 3.79 | 19 |
| 24.09 | 3.69 | 8* |
| 24.96 | 3.57 | 23 |
| 25.55 | 3.49 | 11* |
| 25.93 | 3.44 | 73 |
| 26.82 | 3.32 | 20 |
| 27.54 | 3.24 | 9 |
| 28.32 | 3.15 | 9** |
| 29.07 | 3.07 | 5** |
| 31.50 | 2.840 | 3 |
| 32.15 | 2.784 | 3 |
| 33.31 | 2.690 | 6 |
| 34.48 | 2.601 | 2 |
| 36.26 | 2.478 | 2 |
| 37.03 | 2.428 | 2 |
| 37.75 | 2.383 | 6 |

+ = Non-crystallographic MCM-49 peak
* = Impurity peak
** = May contain impurity peak

TABLE VI

| Degrees 2-Theta | Interplanar d-spacing (A) | I/I$_o$ |
|---|---|---|
| 3.9 | 22.8 | 6+ |
| 6.88 | 12.84 | 46 sh |
| 7.11 | 12.43 | 100 |
| 7.97 | 11.10 | 57 |
| 9.35 | 9.46 | 25* |
| 9.94 | 8.90 | 48 |
| 12.53 | 7.07 | 4* |
| 12.82 | 6.90 | 13 |

TABLE VI-continued

| Degrees 2-Theta | Interplanar d-spacing (A) | I/I$_o$ |
| --- | --- | --- |
| 13.41 | 6.60 | 3* |
| 14.30 | 6.19 | 36 |
| 14.73 | 6.01 | 6 |
| 15.93 | 5.56 | 10 |
| 17.90 | 4.96 | 2 |
| 18.98 | 4.68 | 3 |
| 19.34 | 4.59 | 3 |
| 20.18 | 4.40 | 11 |
| 21.56 | 4.12 | 11 |
| 21.86 | 4.07 | 18 |
| 22.34 | 3.98 | 10 |
| 22.67 | 3.92 | 30 |
| 23.68 | 3.76 | 17 |
| 24.94 | 3.57 | 15 |
| 25.20 | 3.53 | 6* |
| 25.97 | 3.43 | 60 |
| 26.93 | 3.31 | 13 |
| 27.79 | 3.21 | 11 |
| 28.56 | 3.13 | 8** |
| 29.10 | 3.07 | 3** |
| 29.60 | 3.02 | 1 |
| 31.58 | 2.83 | 3 |
| 32.24 | 2.776 | 3 |
| 33.34 | 2.688 | 7 |
| 34.59 | 2.593 | 3 |
| 36.33 | 2.473 | 1 |
| 37.05 | 2.426 | 2 |
| 37.79 | 2.380 | 4 | sh = Shoulder
+ = Non-crystallographic MCM-49 peak
* = Impurity peak
** = May contain impurity peak

EXAMPLE 4

The calcined portion of the product of Example 3 was ammonium exchanged and calcined at 538° C. in air for 16 hours to provide the hydrogen form transformation product of the crystalline MCM-49. The Alpha Test proved this material to have an Alpha Value of 286.

EXAMPLE 5

A 10.5 part quantity of gallium oxide was added to a solution containing 1.0 part sodium aluminate, 3.05 parts 50% NaOH solution and 280 parts H$_2$O. A 25.6 part quantity of HMI was added followed by 56.6 parts of Ultrasil and 1.7 parts of MCM-22 seeds. The slurry was thoroughly mixed.

The composition of the reaction mixture in mole ratios:

| | |
| --- | --- |
| SiO$_2$/Al$_2$O$_3$ = | 138 |
| SiO$_2$/Ga$_2$O$_3$ = | 17.9 |
| OH$^-$/SiO$_2$ = | 0.057 |
| Na/SiO$_2$ = | 0.057 |
| HMI/SiO$_2$ = | 0.30 |
| H$_2$O/SiO$_2$ = | 18.4 |

Figure 4:
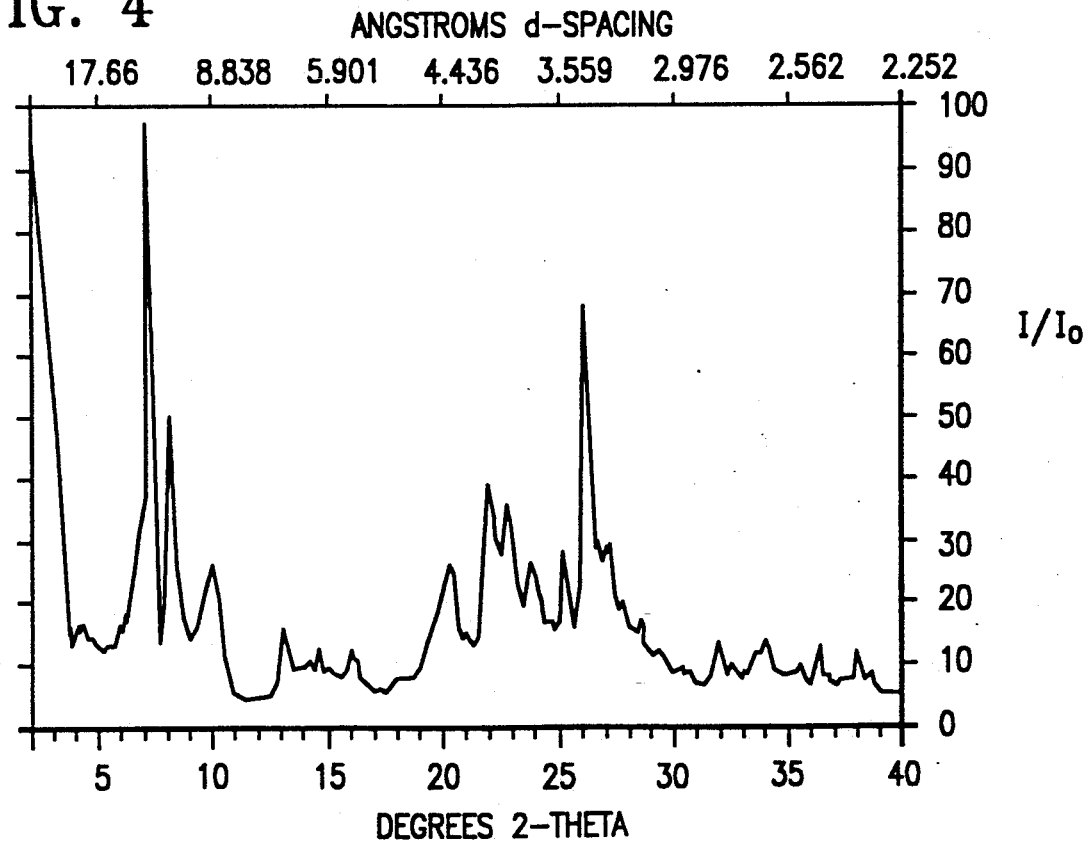

The mixture was crystallized with stirring at 150° C. for 10 days. The product was identified as poorly crystalline MCM-49 and had the X-ray pattern which appears in Table VII and FIG. 4.

The chemical composition of the product was, in wt. %:

| | |
| --- | --- |
| N | 1.89 |
| Na | 0.40 |
| Ga | 8.5 |
| Al$_2$O$_3$ | 0.81 |
| SiO$_2$ | 65.6 |
| Ash | 79.3 | with silica/alumina and silica/gallia molar ratios for the product of:

| | |
| --- | --- |
| SiO$_2$/Al$_2$O$_3$ | 138 |
| SiO$_2$/Ga$_2$O$_3$ | 17.9 |

The sorption capacities, after calcining for 3 hours at 538° C., in wt. %:

| | |
| --- | --- |
| Cyclohexane, 40 Torr | 13.3 |
| n-Hexane, 40 Torr | 11.3 |
| H$_2$O, 12 Torr | 12.3 |

A portion of the sample was calcined in air for 16 hours at 538° C. This material exhibited the X-ray diffraction pattern shown in Table VIII.

TABLE VII

| Degrees 2-Theta | Interplanar d-spacing (A) | I/I$_o$ |
| --- | --- | --- |
| 3.9 | 22.8 | 6+ |
| 6.66 | 13.27 | 30 sh |
| 7.08 | 12.48 | 100 |
| 7.92 | 11.17 | 43 |
| 9.27 | 9.54 | 8* |
| 9.74 | 9.08 | 20 |
| 12.78 | 6.93 | 12 |
| 13.75 | 6.44 | 6 |
| 14.28 | 6.20 | 5 |
| 14.62 | 6.06 | 3 |
| 15.78 | 5.62 | 8 |
| 17.99 | 4.93 | 3 |
| 18.92 | 4.69 | 6 |
| 20.10 | 4.42 | 24 |
| 20.86 | 4.26 | 9 |
| 21.47 | 4.14 | 10 |
| 21.73 | 4.09 | 26 |
| 22.57 | 3.94 | 29 |
| 23.53 | 3.78 | 22 |
| 24.92 | 3.57 | 24 |
| 25.91 | 3.44 | 82 |
| 26.80 | 3.33 | 19 |
| 27.43 | 3.25 | 14 |
| 28.31 | 3.15 | 10 |
| 29.04 | 3.07 | 5 |
| 31.59 | 2.832 | 8 |
| 32.17 | 2.783 | 3 |
| 33.25 | 2.694 | 6 |
| 33.70 | 2.659 | 8* |
| 35.12 | 2.555 | 4* |
| 35.96 | 2.497 | 11* |
| 36.29 | 2.476 | 4 |
| 37.73 | 2.384 | 7 | sh = Shoulder
+ = Non-crystallographic MCM-49 peak
* = Impurity peak

TABLE VIII

| Degrees 2-Theta | Interplanar d-spacing (A) | I/I$_o$ |
| --- | --- | --- |
| 3.9 | 22.8 | 11+ |
| 6.89 | 12.83 | 40 sh |
| 7.11 | 12.43 | 100 |
| 7.96 | 11.11 | 55 |
| 9.40 | 9.41 | 10* |
| 9.94 | 8.90 | 47 |
| 12.81 | 6.91 | 10 |
| 14.31 | 6.19 | 32 |
| 14.74 | 6.01 | 4 |
| 15.94 | 5.56 | 12 |

TABLE VIII-continued

| Degrees 2-Theta | Interplanar d-spacing (A) | I/I$_o$ |
|---|---|---|
| 17.89 | 4.96 | <1 |
| 19.00 | 4.67 | 3 |
| 19.39 | 4.58 | 3 |
| 20.22 | 4.39 | 9 |
| 21.56 | 4.12 | 9 |
| 21.86 | 4.07 | 17 |
| 22.70 | 3.92 | 29 |
| 23.70 | 3.75 | 16 |
| 24.99 | 3.56 | 14 |
| 26.01 | 3.43 | 57 |
| 26.96 | 3.31 | 12 |
| 27.84 | 3.20 | 10 |
| 28.60 | 3.12 | 5 |
| 29.10 | 3.07 | 3 |
| 31.63 | 2.829 | 6 |
| 32.28 | 2.773 | 3 |
| 33.39 | 2.684 | 7 |
| 33.72 | 2.658 | 9* |
| 35.07 | 2.559 | 4* |
| 35.94 | 2.499 | 4* |
| 36.40 | 2.468 | 1 |
| 37.13 | 2.422 | 2 |
| 37.88 | 2.375 | 3 | sh = Shoulder
+ = Non-crystallographic MCM-49 peak
* = Impurity peak

EXAMPLE 6

The calcined portion of the product of Example 5 was ammonium exchanged and calcined at 538° C. in air for 16 hours to provide the hydrogen form transformation product of the crystalline MCM-49. The Alpha Test proved this material to have an Alpha Value of 64.

EXAMPLE 7

A solution containing 1 part of Al$_2$(SO$_4$)$_3$.xH$_2$O, 1.31 parts of 50% NaOH solution and 14.0 parts of H$_2$O was prepared. To this were added 2.8 parts of Ultrasil precipitated silica followed by 1.48 parts of HMI. The reaction mixture was thoroughly mixed. The composition of the reaction mixture in mole ratios was:

| | |
|---|---|
| SiO$_2$/Al$_2$O$_3$ = | 25.5 |
| OH$^-$/SiO$_2$ = | 0.15 |
| Na/SiO$_2$ = | 0.39 |
| HMI/SiO$_2$ = | 0.35 |
| H$_2$O/SiO$_2$ = | 19.4 |

Figure 5:
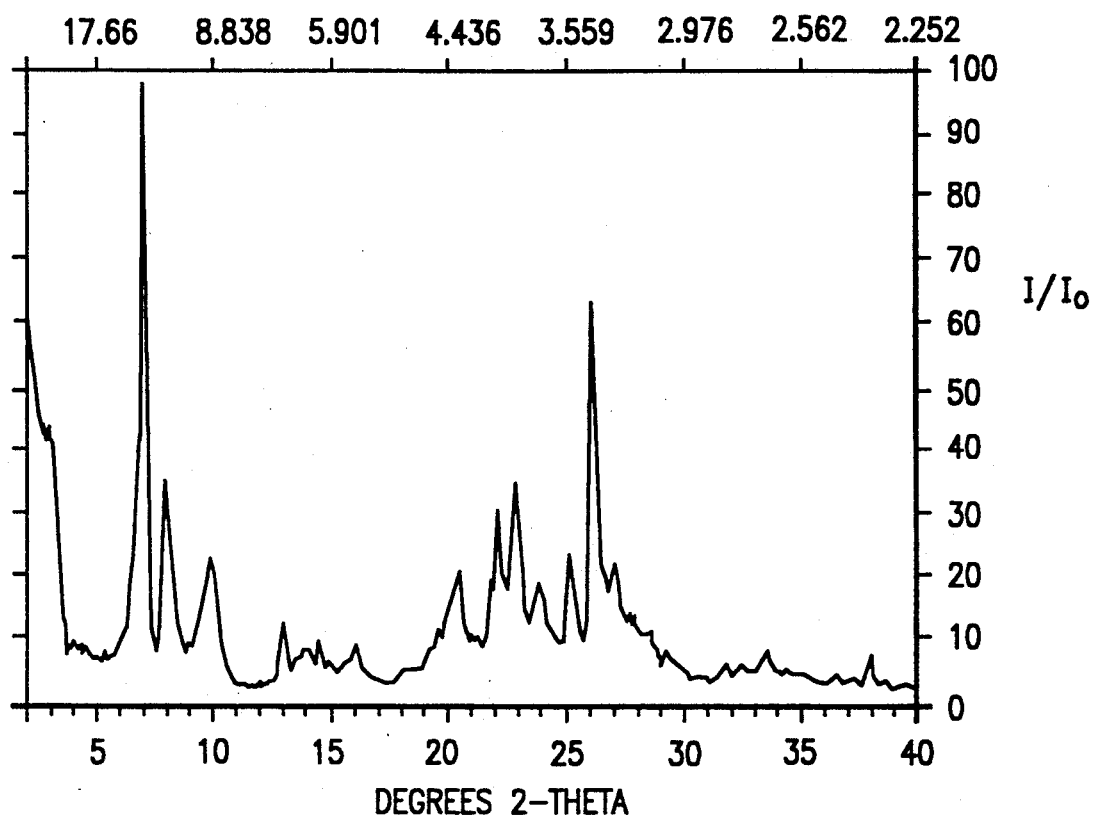

The mixture was crystallized for 5 days at 143° C. The product was washed, dried at 120° C. and identified by X-ray analysis as MCM-49. It exhibited an X-ray pattern as shown in Table IX and FIG. 5.

The sorption capacities, after calcining for 16 hours at 538° C. were, in wt. %:

| | |
|---|---|
| Cyclohexane, 40 Torr | 8.8 |
| n-Hexane, 40 Torr | 15.9 |
| H$_2$O, 12 Torr | 13.6 |

The chemical composition of the product was, in wt. %:

| | |
|---|---|
| N | 1.83 |
| Na | 0.27 |
| Al$_2$O$_3$ | 6.8 |
| SiO$_2$ | 73.8 |
| Ash | 80.5 |

The silica/alumina mole ratio of the product was 18.4.
The surface area of this material was measured to be 459 m$^2$/g.

A portion of the sample was calcined in air for 16 hours at 538° C. This material exhibited the X-ray diffraction pattern shown in Table X.

TABLE IX

| Degrees 2-Theta | Interplanar d-spacing (A) | I/I$_o$ |
|---|---|---|
| 3.1 | 28.5 | 17 |
| 4.0 | 22.2 | 3+ |
| 6.73 | 13.14 | 43 sh |
| 7.08 | 12.48 | 100 |
| 7.92 | 11.16 | 42 |
| 9.69 | 9.13 | 23 |
| 12.80 | 6.91 | 13 |
| 13.76 | 6.44 | 7 |
| 14.27 | 6.20 | 6 |
| 14.65 | 6.05 | 3 |
| 15.85 | 5.59 | 7 |
| 17.82 | 4.98 | 2 |
| 18.92 | 4.69 | 3 |
| 19.32 | 4.59 | 8 |
| 20.13 | 4.41 | 20 |
| 21.48 | 4.14 | 12 |
| 21.82 | 4.07 | 31 |
| 22.56 | 3.94 | 36 |
| 23.59 | 3.77 | 18 |
| 24.91 | 3.57 | 22 |
| 25.91 | 3.44 | 79 |
| 26.74 | 3.33 | 20 |
| 27.61 | 3.23 | 7 |
| 28.25 | 3.16 | 8 |
| 29.14 | 3.06 | 3 |
| 31.48 | 2.842 | 3 |
| 32.16 | 2.783 | 3 |
| 33.26 | 2.694 | 6 |
| 33.85 | 2.648 | 3 sh |
| 34.72 | 2.584 | 2 |
| 36.26 | 2.478 | 2 |
| 37.00 | 2.429 | 2 |
| 37.73 | 2.384 | 7 | sh = Shoulder
+ = Non-crystallographic MCM-49 peak

TABLE X

| Degrees 2-Theta | Interplanar d-spacing (A) | I/I$_o$ |
|---|---|---|
| 3.9 | 22.8 | 6+ |
| 6.91 | 12.79 | 38 sh |
| 7.12 | 12.42 | 100 |
| 7.96 | 11.10 | 53 |
| 9.94 | 8.90 | 39 |
| 12.84 | 6.90 | 11 |
| 14.30 | 6.19 | 39 |
| 14.71 | 6.02 | 10 |
| 15.92 | 5.57 | 12 |
| 18.00 | 4.93 | 1 |
| 18.98 | 4.67 | 3 |
| 19.34 | 4.59 | 3 |
| 20.17 | 4.40 | 10 |
| 21.55 | 4.12 | 10 |
| 21.86 | 4.07 | 17 |
| 22.67 | 3.92 | 27 |
| 23.69 | 3.75 | 15 |
| 24.96 | 3.57 | 13 |
| 25.98 | 3.43 | 61 |
| 26.93 | 3.31 | 13 |
| 27.80 | 3.21 | 9 |
| 28.58 | 3.12 | 6 |
| 29.11 | 3.07 | 2 |
| 29.63 | 3.02 | 1 |
| 31.57 | 2.834 | 3 |
| 32.23 | 2.777 | 3 |

TABLE X-continued

| Degrees 2-Theta | Interplanar d-spacing (A) | I/I$_o$ |
|---|---|---|
| 33.35 | 2.687 | 6 |
| 34.60 | 2.593 | 3 |
| 36.34 | 2.472 | 1 |
| 37.06 | 2.426 | 1 |
| 37.83 | 2.378 | 5 | sh = Shoulder
+ = Non-crystallographic MCM-49 peak

EXAMPLE 8

A 2.24 part quantity of 45% sodium aluminate was added to a solution containing 1.0 part of 50% NaOH solution and 43.0 parts H$_2$O in an autoclave. An 8.57 part quantity of Ultrasil precipitated silica was added with agitation, followed by 4.51 parts of HMI.

The reaction mixture had the following composition, in mole ratios:

| | |
|---|---|
| SiO$_2$/Al$_2$O$_3$ = | 23 |
| OH$^-$/SiO$_2$ = | 0.21 |
| Na/SiO$_2$ = | 0.21 |
| HMI/SiO$_2$ = | 0.35 |
| H$_2$O/SiO$_2$ = | 19.3 |

Figure 6:
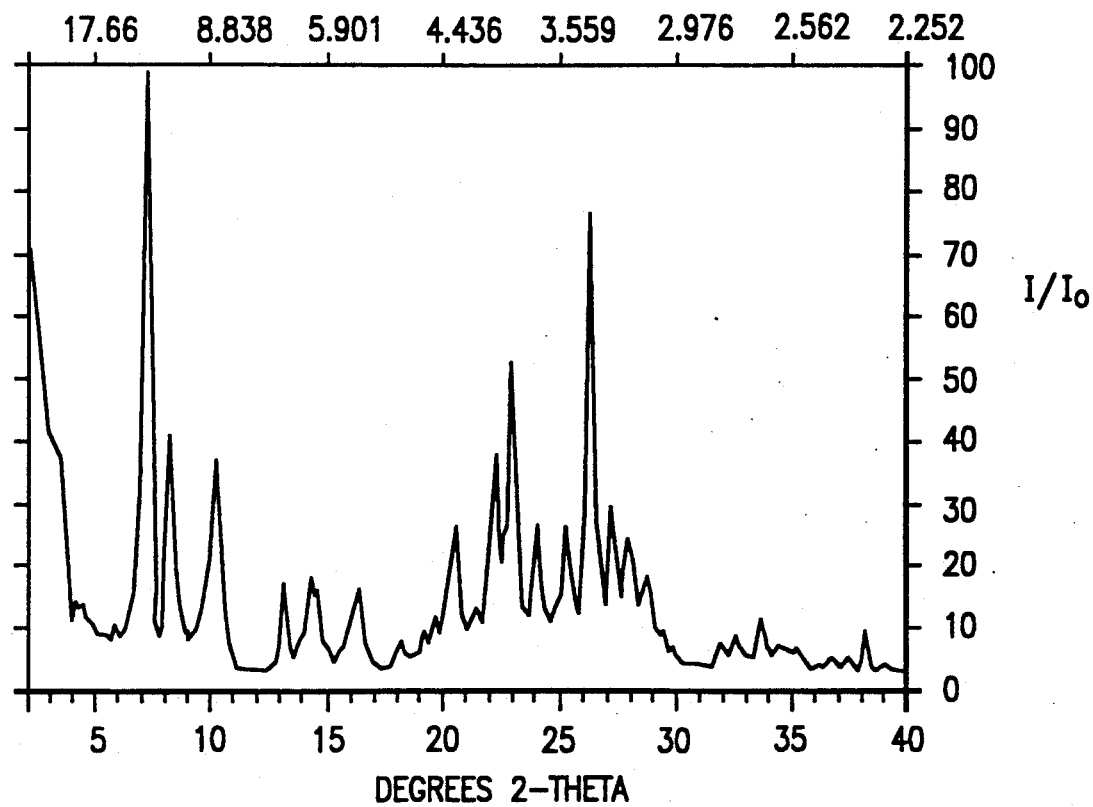

The mixture was crystallized at 150° C. for 84 hours with stirring. The product was identified as MCM-49 and had the X-ray pattern which appears in Table XI and FIG. 6.

The chemical composition of the product was, in wt. %:

| | |
|---|---|
| N | 1.70 |
| Na | 0.70 |
| Al$_2$O$_3$ | 7.3 |
| SiO$_2$ | 74.5 |
| Ash | 84.2 |

The silica/alumina mole ratio of the product was 17.3.

The sorption capacities, after calcining at 538° C. for 9 hours were, in wt. %:

| | |
|---|---|
| Cyclohexane, 40 Torr | 10.0 |
| n-Hexane, 40 Torr | 13.1 |
| H$_2$O, 12 Torr | 15.4 |

A portion of the sample was calcined in air for 3 hours at 538° C.. This material exhibited the X-ray diffraction pattern shown in Table XII.

TABLE XI

| Degrees 2-Theta | Interplanar d-spacing (A) | I/I$_o$ |
|---|---|---|
| 3.1 | 28.5 | 18 |
| 3.9 | 22.8 | 7+ |
| 6.81 | 12.99 | 61 sh |
| 7.04 | 12.55 | 97 |
| 7.89 | 11.21 | 41 |
| 9.80 | 9.03 | 40 |
| 12.76 | 6.94 | 17 |
| 13.42 | 6.60 | 4* |
| 13.92 | 6.36 | 17 |
| 14.22 | 6.23 | 11 |
| 14.63 | 6.05 | 2 |
| 15.81 | 5.61 | 15 |
| 17.71 | 5.01 | 4 |
| 18.86 | 4.71 | 4 |
| 19.23 | 4.62 | 6 |
| 20.09 | 4.42 | 27 |
| 20.93 | 4.24 | 8 |
| 21.44 | 4.14 | 17 |
| 21.74 | 4.09 | 37 |
| 22.16 | 4.01 | 17 |
| 22.56 | 3.94 | 58 |
| 23.53 | 3.78 | 26 |
| 24.83 | 3.59 | 22 |
| 25.08 | 3.55 | 10 |
| 25.86 | 3.45 | 100 |
| 26.80 | 3.33 | 28 |
| 27.53 | 3.24 | 21 |
| 28.33 | 3.15 | 15 |
| 28.98 | 3.08 | 4 |
| 29.47 | 3.03 | 2 |
| 31.46 | 2.843 | 4 |
| 32.08 | 2.790 | 6 |
| 33.19 | 2.699 | 9 |
| 34.05 | 2.633 | 5 |
| 34.77 | 2.580 | 4 |
| 36.21 | 2.481 | 2 |
| 36.90 | 2.436 | 3 |
| 37.68 | 2.387 | 8 | sh = Shoulder
+ = Non-crystallographic MCM-49 peak
* = Impurity peak

TABLE XII

| Degrees 2-Theta | Interplanar d-spacing (A) | I/I$_o$ |
|---|---|---|
| 3.2 | 28.0 | 9+ |
| 3.9 | 22.8 | 7+ |
| 6.90 | 12.81 | 48 sh |
| 7.13 | 12.39 | 100 |
| 7.98 | 11.08 | 46 |
| 9.95 | 8.89 | 53 |
| 12.87 | 6.88 | 10 |
| 14.32 | 6.18 | 36 |
| 14.74 | 6.01 | 11 |
| 15.94 | 5.56 | 17 |
| 17.87 | 4.96 | 2 |
| 19.00 | 4.67 | 5 |
| 19.35 | 4.59 | 3 |
| 20.24 | 4.39 | 14 |
| 21.06 | 4.22 | 5 |
| 21.56 | 4.12 | 15 |
| 21.87 | 4.06 | 25 |
| 22.32 | 3.98 | 12 |
| 22.69 | 3.92 | 41 |
| 23.69 | 3.76 | 23 |
| 24.95 | 3.57 | 19 |
| 25.22 | 3.53 | 4 |
| 25.99 | 3.43 | 90 |
| 26.94 | 3.31 | 20 |
| 27.73 | 3.22 | 17 |
| 28.55 | 3.13 | 11 |
| 29.11 | 3.07 | 3 |
| 29.63 | 3.01 | 2 |
| 31.59 | 2.833 | 6 |
| 32.23 | 2.777 | 4 |
| 33.34 | 2.687 | 9 |
| 34.35 | 2.611 | 4 |
| 34.92 | 2.570 | 3 |
| 36.35 | 2.471 | 2 |
| 37.07 | 2.425 | 2 |
| 37.82 | 2.379 | 6 | sh = Shoulder
+ = Non-crystallographic MCM-49 peak

EXAMPLE 9

The calcined portion of the product of Example 8 was ammonium exchanged and calcined at 538° C. in air for 3 hours to provide the hydrogen form transformation product of the crystalline MCM-49. The Alpha Test proved this material to have an Alpha Value of 308.

EXAMPLE 10

In two separate experiments, propylene was passed into a reactor containing catalyst at 538° C., 1 atmosphere pressure, a helium/hydrocarbon ratio of 1.1 and a weight hourly space velocity of 3.10 hr$^{-1}$. The catalyst of the first experiment was hydrogen-form MCM-22 prepared as in Example 1 of U.S. Pat. No. 4,954,325 (hereinafter Example 12). The catalyst of the second experiment was the Example 6 product. After 20 minutes on stream, the product distribution, in weight percent, was determined to be as shown in Table XIII. Significant propylene aromatization selectivity to benzene is observed for the Example 6 catalyst compared to MCM-22. The benzene yield over the Example 6 catalyst was 7.16 wt. %, compared to 2.64 wt. % for MCM-22.

TABLE XIII

PROPYLENE AROMATIZATION

| Catalyst | MCM-22 | Example 6 |
|---|---|---|
| Product Dist., wt. % | | |
| $C_1$ | 0.35 | 1.28 |
| $C_2=$ | 1.59 | 8.72 |
| $C_2$ | 12.82 | 0.00 |
| $C_3 + C_3=$ | 34.58 | 41.87 |
| Iso-$C_4$ | 9.28 | 2.73 |
| N—$C_4$ | 2.65 | 0.00 |
| Iso + 1-$C_4=$ | 4.58 | 5.51 |
| C—$C_4=$ | 1.72 | 2.31 |
| T—$C_4=$ | 2.49 | 1.82 |
| N—$C_5$ | 0.24 | 0.10 |
| Cyclo-$C_5$ | 0.59 | 0.19 |
| Iso-$C_5$ | 2.27 | 0.93 |
| $C_5=$ | 2.25 | 2.94 |
| $C_6$ Par. | 1.04 | 0.52 |
| $C_6=$ | 0.18 | 0.22 |
| $C_7$ Par. + OL. | 0.22 | 0.12 |
| $C_8$-$C_{12}$ Par. + OL. | 0.00 | 0.00 |
| $C_{13}+$ Par. + OL. | 0.00 | 0.00 |
| Benzene | 2.64 | 7.16 |
| Toluene | 9.08 | 8.10 |
| $C_8$ Ar. | 7.52 | 6.78 |
| $C_9$ Ar. | 3.01 | 3.87 |
| $C_{10}$-$C_{11}$ Ar. | 0.29 | 0.91 |
| $C_{12}+$ Ar. | 0.00 | 0.00 |
| Naphthalene | 0.38 | 0.77 |
| M-Naphthalenes | 0.26 | 3.16 |

EXAMPLE 11

Sodium aluminate comprising 40 wt. % $Al_2O_3$, 33 wt. % $Na_2O$, and 27 wt. % $H_2O$ was added to a solution containing NaOH and $H_2O$ in an autoclave. Ultrasil precipitated silica was then added with agitation, followed by aminocyclcoheptane (R) directing agent to form a reaction mixture.

This mixture had the following composition, in mole ratios:

| | |
|---|---|
| $SiO_2/Al_2O_3 =$ | 33.34 |
| $OH^-/SiO_2 =$ | 0.18 |
| $Na/SiO_2 =$ | 0.18 |
| $R/SiO_2 =$ | 0.35 |
| $H_2O/SiO_2 =$ | 18.83 |

Figure 7:
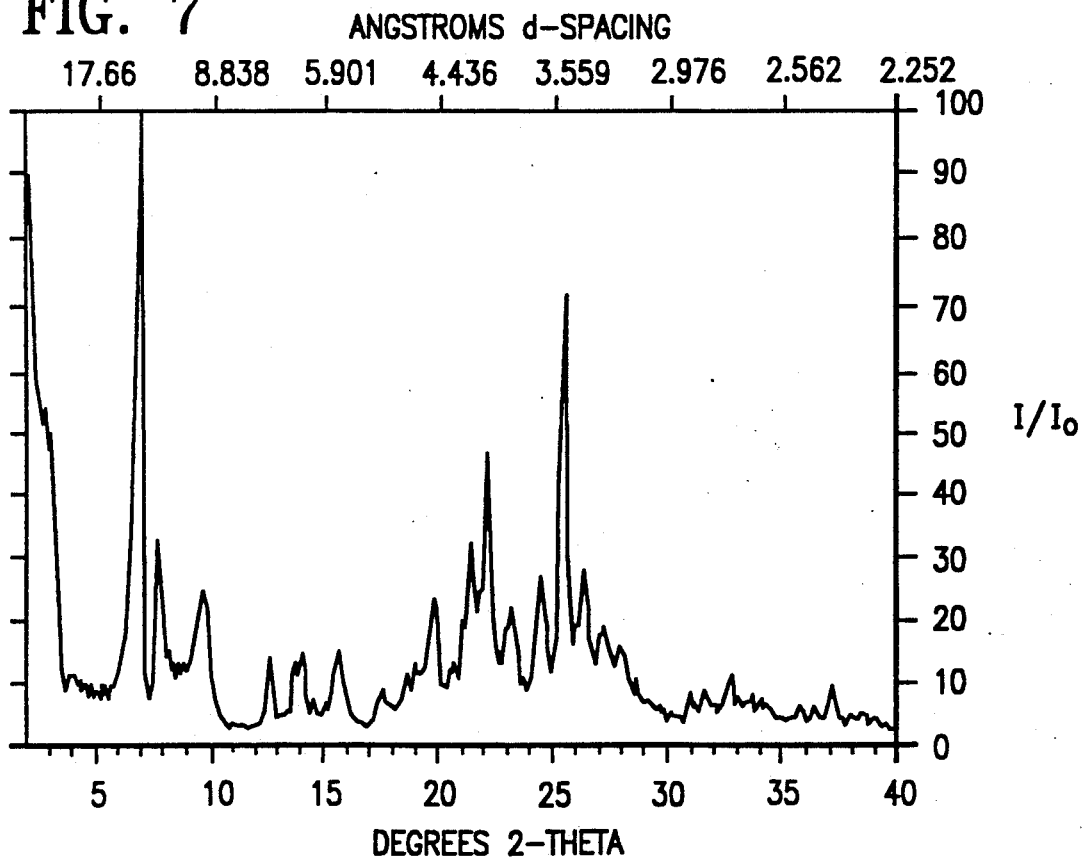

The mixture was crystallized at 143° C. for 192 hours with stirring. The product was identified as MCM-49 and had the X-ray pattern which appears in Table XIV and FIG. 7.

The chemical composition of the product was, in wt. %:

| | |
|---|---|
| N | 1.51 |
| Na | 0.83 |
| $Al_2O_3$ | 4.6 |
| $SiO_2$ | 74.2 |
| Ash | 79.2 |

The silica/alumina mole ratio of the product was 27.4.

The sorption capacities, after calcining at 538° C. for 9 hours were, in wt. %:

| | |
|---|---|
| Cyclohexane, 40 Torr | 7.5 |
| n-Hexane, 40 Torr | 14.0 |
| $H_2O$, 12 Torr | 13.5 |

TABLE XIV

| Degrees 2-Theta | Interplanar d-spacing (A) | $I/I_o$ |
|---|---|---|
| 4.1 | 21.4 | 1 |
| 6.87 | 12.87 | 41 |
| 7.14 | 12.38 | 100 |
| 7.98 | 11.09 | 26 |
| 9.88 | 8.95 | 18 |
| 12.85 | 6.89 | 14 |
| 14.00 | 6.33 | 10 |
| 14.31 | 6.19 | 11 |
| 14.74 | 6.01 | 2 |
| 15.88 | 5.58 | 13 |
| 17.79 | 4.99 | 4 |
| 18.95 | 4.68 | 6 |
| 19.34 | 4.59 | 7 |
| 20.20 | 4.40 | 18 |
| 21.06 | 4.22 | 7 |
| 21.51 | 4.13 | 12 |
| 21.82 | 4.07 | 27 |
| 22.63 | 3.93 | 46 |
| 23.60 | 3.77 | 19 |
| 24.90 | 3.58 | 25 |
| 25.14 | 3.54 | 7 |
| 25.92 | 3.44 | 90 |
| 26.82 | 3.32 | 26 |
| 27.66 | 3.22 | 13 |
| 28.43 | 3.14 | 12 |
| 29.03 | 3.08 | 4 |
| 29.45 | 3.03 | 3 |
| 31.51 | 2.839 | 4 |
| 32.15 | 2.784 | 5 |
| 33.24 | 2.695 | 8 |
| 34.13 | 2.627 | 4 |
| 34.84 | 2.575 | 2 |
| 36.26 | 2.477 | 3 |
| 36.97 | 2.431 | 3 |
| 37.73 | 2.384 | 7 |

EXAMPLE 12

For comparison purposes, Example 1 of U.S. Pat. No. 4,954,325, incorporated herein by reference, was repeated. The as-synthesized crystalline material of the Example, referred to herein as MCM-22 precursor or the precursor form of MCM-22, was examined by X-ray diffraction analysis. Its X-ray diffraction pattern is presented in Table XV. The X-ray diffraction pattern of the calcined form of this material (538° C. for 20 hours) is shown in Table XVI below, and in FIG. 1 of U.S. Pat. No. 4,954,325.

TABLE XV

| Degrees 2-Theta | Interplanar d-spacing (A) | I/I$_o$ |
| --- | --- | --- |
| 3.1 | 28.5 | 14 |
| 3.9 | 22.7 | <1 |
| 6.53 | 13.53 | 36 |
| 7.14 | 12.38 | 100 |
| 7.94 | 11.13 | 34 |
| 9.67 | 9.15 | 20 |
| 12.85 | 6.89 | 6 |
| 13.26 | 6.68 | 4 |
| 14.36 | 6.17 | 2 |
| 14.70 | 6.03 | 5 |
| 15.85 | 5.59 | 4 |
| 19.00 | 4.67 | 2 |
| 19.85 | 4.47 | 22 |
| 21.56 | 4.12 | 10 |
| 21.94 | 4.05 | 19 |
| 22.53 | 3.95 | 21 |
| 23.59 | 3.77 | 13 |
| 24.98 | 3.56 | 20 |
| 25.98 | 3.43 | 55 |
| 26.56 | 3.36 | 23 |
| 29.15 | 3.06 | 4 |
| 31.58 | 2.833 | 3 |
| 32.34 | 2.768 | 2 |
| 33.48 | 2.676 | 5 |
| 34.87 | 2.573 | 1 |
| 36.34 | 2.472 | 2 |
| 37.18 | 2.418 | 1 |
| 37.82 | 2.379 | 5 |

TABLE XVI

| Degrees 2-Theta | Interplanar d-spacing (A) | I/I$_o$ |
| --- | --- | --- |
| 2.80 | 31.55 | 25 |
| 4.02 | 21.98 | 10 |
| 7.10 | 12.45 | 96 |
| 7.95 | 11.12 | 47 |
| 10.00 | 8.85 | 51 |
| 12.90 | 6.86 | 11 |
| 14.34 | 6.18 | 42 |
| 14.72 | 6.02 | 15 |
| 15.90 | 5.57 | 20 |
| 17.81 | 4.98 | 5 |
| 19.08 | 4.65 | 2 |
| 20.20 | 4.40 | 20 |
| 20.91 | 4.25 | 5 |
| 21.59 | 4.12 | 20 |
| 21.92 | 4.06 | 13 |
| 22.67 | 3.92 | 30 |
| 23.70 | 3.75 | 13 |
| 25.01 | 3.56 | 20 |
| 26.00 | 3.43 | 100 |
| 26.96 | 3.31 | 14 |
| 27.75 | 3.21 | 15 |
| 28.52 | 3.13 | 10 |
| 29.01 | 3.08 | 5 |
| 29.71 | 3.01 | 5 |
| 31.61 | 2.830 | 5 |
| 32.21 | 2.779 | 5 |
| 33.35 | 2.687 | 5 |
| 34.61 | 2.592 | 5 |

What is claimed is:

1. A synthetic porous crystalline material characterized by an X-ray diffraction pattern including values substantially as follows:

| Interplanar d-Spacing (A) | Relative Intensity |
| --- | --- |
| 13.15 ± 0.26 | w-s (shoulder) |
| 12.49 ± 0.24 | vs |
| 11.19 ± 0.22 | m-s |
| 6.43 ± 0.12 | w |
| 4.98 ± 0.10 | w |
| 4.98 ± 0.10 | w |
| 4.69 ± 0.09 | w |
| 3.44 ± 0.07 | vs |
| 3.24 ± 0.06 | w | and having a composition comprising the molar relationship $$X_2O_3:(n)YO_2,$$

wherein n is less than about 35, X is a trivalent element and Y is a tetravalent element.

2. The synthetic porous crystalline material of claim 1 characterized by an X-ray diffraction pattern including values substantially as set forth in Table III of the specification.

3. The synthetic porous crystalline material of claim 1 characterized by an X-ray diffraction pattern including values substantially as set forth in Table V of the specification.

4. The synthetic porous crystalline material of claim 1 characterized by an X-ray diffraction pattern including values substantially as set forth in Table VII of the specification.

5. The synthetic porous crystalline material of claim 1 characterized by an X-ray diffraction pattern including values substantially as set forth in Table IX of the specification.

6. The synthetic porous crystalline material of claim 1 characterized by an X-ray diffraction pattern including values substantially as set forth in Table XI of the specification.

7. The synthetic porous crystalline material of claim 1 characterized by an X-ray diffraction pattern including values substantially as set forth in Table XIV of the specification.

8. The crystalline material of claim 1 wherein n is from about 10 to less than about 35.

9. The crystalline material of claim 8 wherein n is from about 15 to about 31.

10. The crystalline material of claim 1 having a composition, on an anhydrous basis and in terms of moles of oxides per n moles of YO$_2$, expressed by the formula:

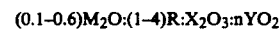

$$(0.1-0.6)M_2O:(1-4)R:X_2O_3:nYO_2$$

wherein M is alkali or alkaline earth metal and R is an organic moiety.

11. The crystalline material of claim 10 wherein said R is selected from the group consisting of cycloalkylamine, azacycloalkane, diazacycloalkane, and mixtures thereof.

12. The crystalline material comprising the crystalline material of claim 10 having original cations replaced, at least in part, with a cation or a mixture of cations selected from the group consisting of hydrogen and hydrogen precursors, rare earth metals, and metals of Groups IIA, IIIA, IVA, IB, IIB, IIIB, IVB, VIB and VIII of the Periodic Table of the Elements.

13. The crystalline material of claim 1 wherein X comprises aluminum and Y comprises silicon.

14. The crystalline material of claim 1 wherein X comprises gallium and Y comprises silicon.

15. The crystalline material of claim 8 wherein X comprises aluminum and Y comprises silicon.

16. The crystalline material of claim 9 wherein X comprises aluminum and Y comprises silicon.

17. The crystalline material of claim 12 wherein said replacing cations comprise hydrogen or a hydrogen precursor.

18. The crystalline material of claim 12 wherein said replacing cations comprise metals.

19. A composition comprising the crystalline material of claim 1 and a matrix.

20. The composition of claim 19 wherein said matrix comprises alumina, silica, zirconia, titania, magnesia, beryllia or a combination thereof.

21. A synthetic porous crystalline material having the X-ray diffraction pattern of FIG. 2.

22. A synthetic porous crystalline material having the X-ray diffraction pattern of FIG. 5.

23. A synthetic porous crystalline material having the X-ray diffraction pattern of FIG. 6.

24. A synthetic porous crystalline material having the X-ray diffraction pattern of FIG. 7.

25. A process for converting a feedstock comprising hydrocarbon compounds to conversion product which comprises contacting said feedstock at conversion conditions with a catalyst comprising an active form of synthetic porous crystalline material characterized by an X-ray diffraction pattern including values substantially as follows:

| Interplanar d-Spacing (A) | Relative Intensity |
|---|---|
| 13.15 ± 0.26 | w-s (shoulder) |
| 12.49 ± 0.24 | vs |
| 11.19 ± 0.22 | m-s |
| 6.43 ± 0.12 | w |
| 4.98 ± 0.10 | w |
| 4.98 ± 0.10 | w |
| 4.69 ± 0.09 | w |
| 3.44 ± 0.07 | vs |
| 3.24 ± 0.06 | w | and having a composition comprising the molar relationship $X_2O_3:(n)YO_2,$ wherein n is less than about 35, X is a trivalent element and Y is a tetravalent element.

26. The process of claim 25 wherein said feedstock comprises an olefin and said product comprises an aromatic.

27. The process of claim 26 wherein said feedstock comprises propylene.

* * * * *